United States Patent
Hartman et al.

(10) Patent No.: US 6,619,380 B1
(45) Date of Patent: Sep. 16, 2003

(54) HEAT EXCHANGER DRAIN ASSEMBLY HAVING A FRANGIBLE WALL

(75) Inventors: Brian M. Hartman, Lockport, NY (US); Robert Charles Gmerek, Burt, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/128,322

(22) Filed: Apr. 23, 2002

(51) Int. Cl.$^7$ .............................. F28F 9/02; F16K 17/40
(52) U.S. Cl. ....................... 165/71; 165/173; 137/68.19
(58) Field of Search .......................... 165/71, 72, 148, 165/173, 905; 137/68.19, 68.21, 68.29, 68.3

(56) References Cited

U.S. PATENT DOCUMENTS

| | | | |
|---|---|---|---|
| 3,744,558 A | 7/1973 | Childress | 165/71 |
| 3,910,550 A | 10/1975 | Nelson | 251/144 |
| 4,006,775 A | * 2/1977 | Avrea | 165/51 |
| 4,193,575 A | 3/1980 | Burgess | 251/144 |
| 4,449,692 A | 5/1984 | Rhodes | 251/144 |
| 4,583,650 A | 4/1986 | Bartholomew | 215/206 |
| 5,267,666 A | * 12/1993 | Hinrichs et al. | 137/68.21 |
| 5,364,069 A | 11/1994 | Minner et al. | 251/144 |
| 5,454,592 A | * 10/1995 | Blumenthal et al. | 137/68.27 |
| 5,464,247 A | * 11/1995 | Rizzi et al. | 280/737 |
| 5,664,804 A | * 9/1997 | Saccone | 137/68.13 |

* cited by examiner

Primary Examiner—Henry Bennett
Assistant Examiner—Tho Van Duong
(74) Attorney, Agent, or Firm—Patrick M. Griffin

(57) ABSTRACT

A heat exchanger (10) having a heat exchanger drain assembly (28) comprising a manifold (12) for storing fluid. A drain port (20) is integrally formed with the manifold (12) and is in selective fluid communication with the reservoir (36) for selectively draining the fluid from the manifold (12). A plug (32) is disposed within the drain port (20) for preventing fluid from draining from the manifold (12). The plug (32) is removable from the drain port ((20) for allowing fluid to drain from the manifold (12). A frangible wall (40) is formed between the drain port (20) and the reservoir (36) to close the drain port (20) and create a non-functional drain port (20), thereby preventing fluid communication between the drain port (20) and the reservoir (36). The frangible wall (40) is fracturable to provide the fluid communication between the drain port (20) and the reservoir (36) for draining the fluid from the tank (12).

15 Claims, 4 Drawing Sheets

HEAT EXCHANGER DRAIN ASSEMBLY HAVING A FRANGIBLE WALL

BACKGROUND OF THE INVENTION

1. Field of the Invention

The subject invention relates to a heat exchanger drain assembly for selectively draining a fluid from the heat exchanger.

2. Description of the Prior Art

Heat exchangers, such as automotive radiators, include a heat transfer area having a plurality of tubes and corrugated fins and a manifold mounted to each end of the heat transfer area. Fluid, such as radiator coolant, flows through the tubes and manifolds to facilitate an exchange of heat to reduce the temperature of the fluid. At times, the radiator coolant is replaced. A drain port is typically provided at the bottom of one of the manifolds. A plug is disposed in the drain port wherein the plug may be removed, or partially removed, to open the drain port and allow the fluid to flow out of the radiator. U.S. Pat. No. 4,193,575 discloses a radiator drain assembly having a partially removable plug. Alternatively, an outlet hose, which is connected to one of the manifolds, can be detached which allows the radiator coolant to flow out of the radiator. Hence, during certain situations the coolant can be removed from the radiator without the use of the drain port.

Radiator manifolds have been traditionally made of metal with an internally threaded drain port. The plug has a number of seals and external threads which mate with the internal threads of the drain port. The plug and drain port interconnection, however, is often plagued with parts that leak when initially assembled as well as leaks at the vehicle installation stage. Further, this interconnection is prone to failure due to corrosion of the metal parts over time. Often times a corroded plug cannot be easily released or cannot be removed without causing permanent damage to the radiator. Recently, the manifolds of automotive radiators have been formed of plastic so as to reduce the weight of the radiator and the cost of manufacture. In addition, these plastic manifolds are not subject to corrosion damage. An example of a radiator having a plastic manifold is disclosed in U.S. Pat. No. 4,449,692. However, even with the plastic manifolds the plugs are prone to leakage, which creates unnecessary repair and replacement of the plug and/or radiator.

In addition, radiator coolants have been improved such that these coolants have a long service life and may not require changing during operable life of the vehicle. Hence, the drain port and plug leakage is particularly bothersome in that the plug and coolant must be replaced even though the coolant is within its operable life.

Accordingly, it would be desirable to develop a drain port and plug interconnection that is leak tight during initial assembly and vehicle assembly, and remains leak tight over time while still allowing selective draining of the manifold through the drain port when needed.

SUMMARY OF THE INVENTION AND ADVANTAGES

A heat exchanger having a heat exchanger drain assembly comprising a manifold or tank defining a reservoir for storing fluid therein. A drain port is mounted to the manifold and is in selective fluid communication with the reservoir for selectively draining the fluid from the manifold. In the preferred embodiment, a plug is selectively disposed within the drain port preventing fluid from draining from the manifold and being removable from the drain port for allowing fluid to drain from the manifold. A frangible wall is disposed between the drain port and the reservoir to close the drain port and prevent fluid communication between the drain port and the reservoir. The frangible wall is fracturable to provide the fluid communication between the drain port and the reservoir for draining the fluid from the tank.

Accordingly, the subject invention provides a heat exchanger with a nonfunctioning drain port to ensure leak free use for the life of the radiator. In addition, the subject invention incorporates a frangible wall which can be fractured to allow a fluid, such as radiator coolant, to flow out of the radiator.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
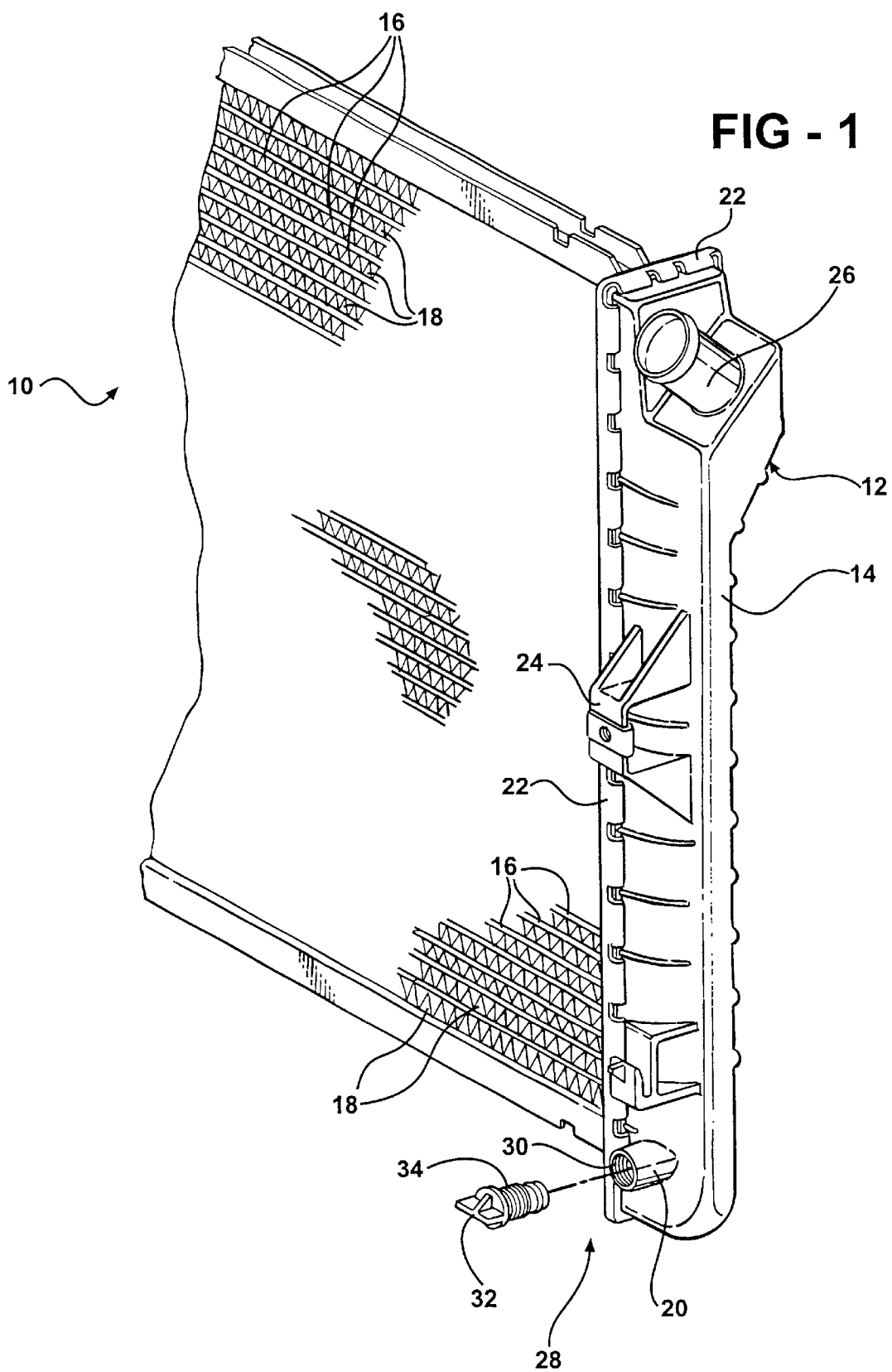
FIG. 1 is a fragmented perspective view of a heat exchanger incorporating the subject invention.

Referring to the Figures, wherein like numerals indicate like or corresponding parts throughout the several views, a heat exchanger is generally shown at 10 in FIG. 1. The heat exchanger 10, as illustrated, is preferably a radiator for a vehicle such as an automobile. Heat exchangers 10 of this type include a pair of opposing manifolds 12 or tanks 12. The manifolds 12 have walls 14 which define chambers for retaining fluid therein. These manifolds 12 or tanks 12 may be of any suitable design or configuration. A plurality of metal tubes 16 interconnect the manifolds 12 and are in fluid communication with the chambers. In addition, a plurality of metal corrugated fins 18 interconnect the tubes 16 as is known in the heat exchanger 10 art. A drain port 20 is mounted to one of the manifolds 12 and is in selective fluid communication with the chamber for selectively draining the fluid from the manifold 12, which in turn drains the fluid from the heat exchanger 10. It should be appreciated that the subject invention may be satisfactorily used in other heat exchangers of any design without deviating from the scope of the subject invention.

The manifold 12 or tank 12 of the subject invention is preferably formed of polymeric or nylon material. The heat exchanger 10 includes a metal mounting face 22 which clasps the nylon manifold 12 to secure the manifold 12 to the remaining portions of the heat exchanger 10. The manifold 12 includes a substantially continuous exterior wall 14 defining the fluid chamber. A mounting flange 24 and an inlet pipe 26 are integrally formed with the exterior wall 14 of the nylon manifold 12.

The heat exchanger 10 has a heat exchanger drain assembly 28 which includes the drain port 20 integrally formed with the exterior wall 14. The drain port 20 has an internally threaded bore 30. The heat exchanger drain assembly 28 also includes a plug 32 being selectively disposed within the drain port 20 for preventing fluid from draining from the manifold 12. The plug 32 is removable from the drain port 20 for allowing fluid to drain from the manifold 12 as is known in the art. The plug 32 includes a series of external threads 34 which correspond to the threaded bore 30 such that the plug 32 is threadingly engageable with the drain port 20.

Figure 2:
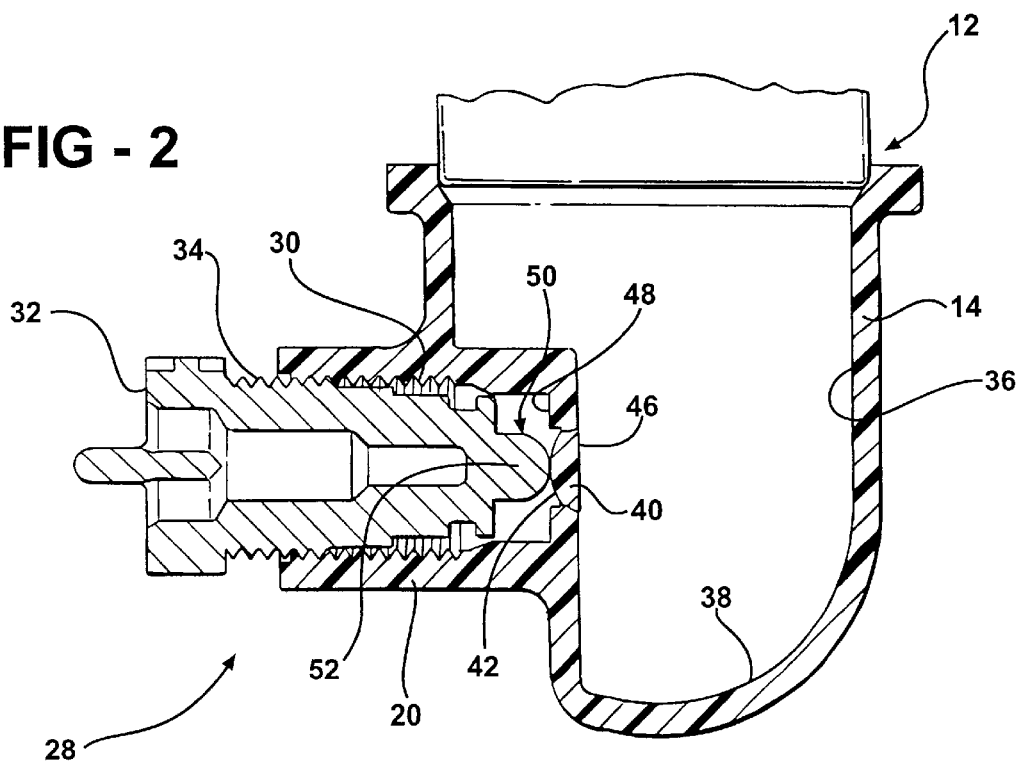
FIG. 2 is a cross-sectional view of a heat exchanger drain assembly with a plug disposed in a drain port for fracturing a frangible wall.
Figure 3:
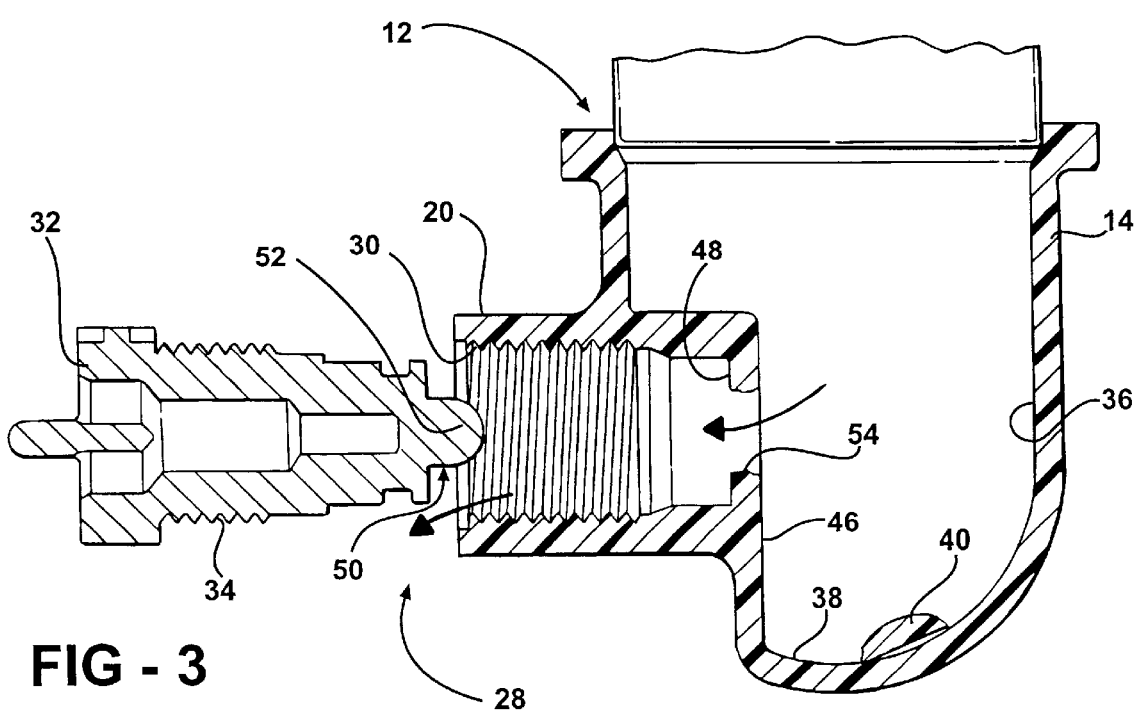
FIG. 3 is a cross-sectional view of the heat exchanger drain assembly of FIG. 2 with the plug removed from the drain port and the frangible wall disposed in a bottom basin of a reservoir.

Referring also to FIGS. 2 and 3, the heat exchanger drain assembly 28 is shown in greater detail. In particular, the fluid chamber includes a reservoir 36 disposed at a bottom basin 38 of the chamber. The exterior wall 14 of the manifold 12 defines both the chamber and the reservoir 36. The reservoir 36 is in selective fluid communication with the drain port 20 as will be discussed in greater detail below.

A frangible wall 40 is disposed between the drain port 20 and the reservoir 36 to close the drain port 20 and prevent fluid communication between the drain port 20 and the reservoir 36. Although not specifically illustrated, the exterior wall 14 is continuous across, or flashed over, the drain port 20 for closing the drain port 20 from the reservoir 36. Hence, the frangible wall 40 creates a non-functioning drain port 20. As discussed in the background section, the radiator coolant may never be changed during the operable life of the vehicle. In addition, if the radiator coolant is to be replaced, the coolant can be removed from the radiator without using the drain port 20. Hence, the subject invention provides a non-functioning drain port 20 that ensures a leak tight drain port 20.

In the event that the drain port 20 must be utilized, the frangible wall 40 is fracturable to provide the fluid communication between the drain port 20 and the reservoir 36 for draining the fluid from the manifold 12 such as shown in FIGS. 2 and 3. Preferably, the manifold 12 or tank 12 includes at least one groove 42 defining the frangible wall 40 with the groove 42 providing a weakened section within the manifold 12 to facilitate the fracturability of the frangible wall 40. The groove 42 is formed within the exterior wall 14 to define the frangible wall 40 aligned with the drain port 20. In particular, the exterior wall 14 includes inner 46 and outer 48 surfaces and the groove 42 is formed within the outer surface 48 facing the drain port 20 to provide a smooth inner surface 46 facing the reservoir 36. Even more preferably, the groove 42 is substantially continuous and defines a perimeter of the frangible wall 40.

As shown in the embodiment of FIGS. 2 and 3, the exterior wall 14 and the frangible wall 40 are of substantially the same thickness. It should be appreciated that the frangible wall 40 may be of any suitable wall thickness so long as the reservoir 36 is sealed from the drain port 20. The groove 42 is illustrated as a continuous annular notch which creates a convex surface on the frangible wall 40.

A tool is used to fracture the frangible wall 40. The tool can be of any suitable design or configuration and can be threaded into the drain port 20. Preferably, the tool is the plug 32 having an engagement portion 50 for selectively engaging the frangible wall 40 to fracture the frangible wall 40. In the embodiment of FIGS. 2 and 3, the plug 32 includes an abutment 52 which aligns with the frangible wall 40 when the plug 32 is disposed within the drain port 20 once the frangible wall 40 is completely fractured. The abutment 52 of the plug 32 engages the frangible wall 40 to fracture the frangible wall 40 about the groove 42 from the exterior wall 14. As discussed above, the plug 32 is threadingly engaged with the drain port 20.

During the fracturing of the frangible wall 40, the plug 32 is threaded, either manually or by use of a wrench or similar device, toward the frangible wall 40. The abutment 52 first engages the frangible wall 40 and then applies sufficient force to fracture the frangible wall 40 about the groove 42, see FIG. 2. As shown in FIG. 3, an aperture 54 is created within the exterior wall 14 aligned with the drain port 20 once the frangible wall 40 is completely fractured. The bottom basin 38 captures the frangible wall 40 when the frangible wall 40 separates from the exterior wall 14. The frangible wall 40 is harmlessly trapped in the reservoir 36 because the frangible wall 40 is larger than the size of the tubes 16 extending between the manifolds 12. The plug 32 may then be removed from the drain port 20 and the coolant within the manifold 12 can flow out of the reservoir 36 through the aperture 54 and drain port 20. The plug 32 may subsequently be threaded back into the drain port 20 to seal the aperture 54 and re-seal the drain port 20 such that the heat exchanger 10 may be refilled with coolant.

Figure 4:
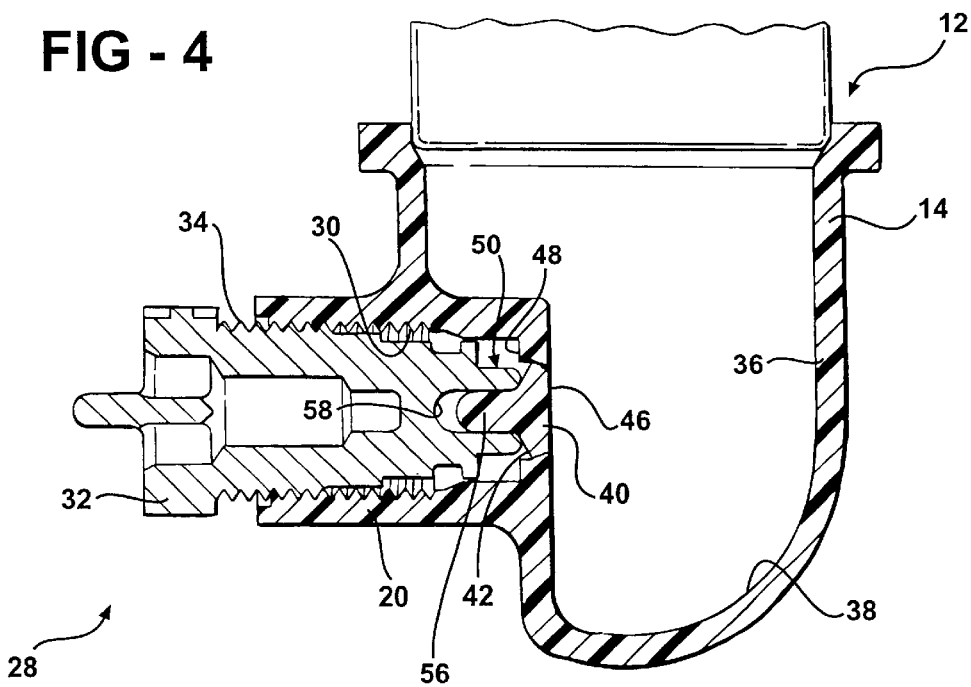
FIG. 4 is a cross-sectional view of an alternative embodiment of a heat exchanger drain assembly with a plug disposed in a drain port for fracturing a frangible wall.
Figure 5:
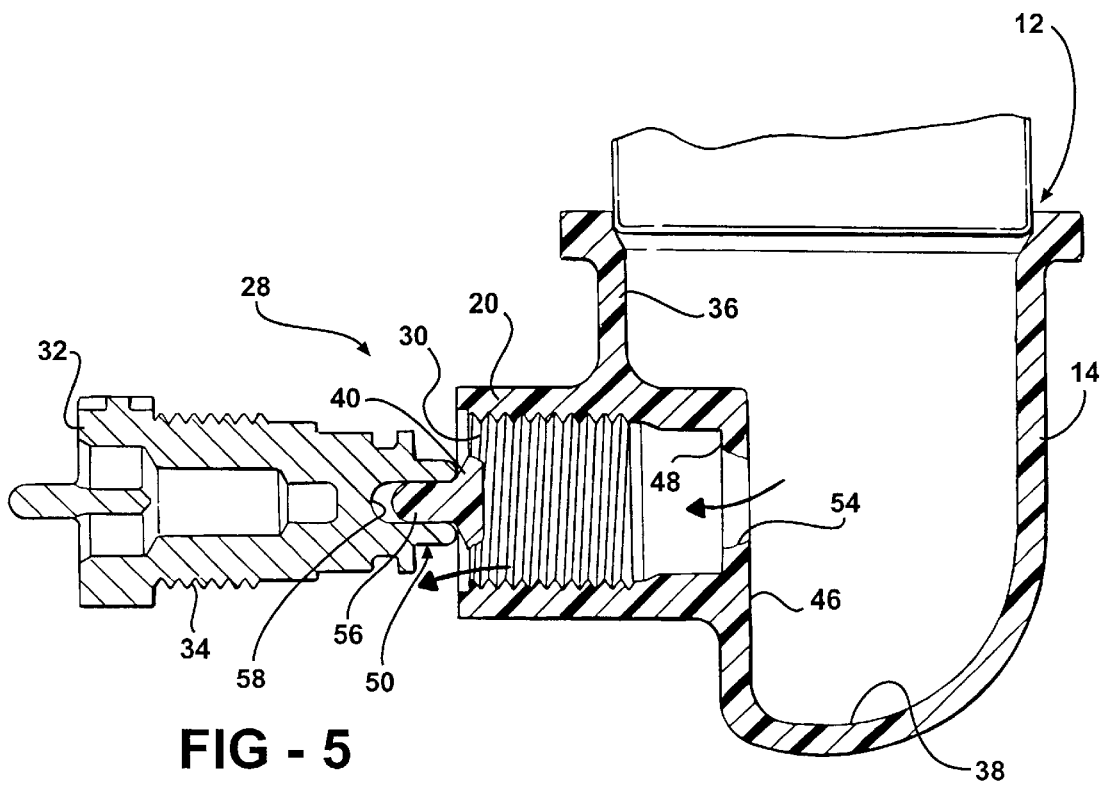
FIG. 5 is a cross-sectional view of the heat exchanger drain assembly of FIG. 4 with the plug and frangible wall removed from the drain port.

Turning to FIGS. 4 and 5, an alternative embodiment of the heat exchanger drain assembly 28 is shown. The heat exchanger drain assembly 28 of this embodiment also includes the fluid chamber having a reservoir 36 disposed at a bottom basin 38 of the chamber. The frangible wall 40 is disposed between the drain port 20 and the reservoir 36 to close the drain port 20 and prevent fluid communication between the drain port 20 and the reservoir 36. As with the embodiment of FIGS. 2 and 3, the exterior wall 14 is continuous across, or flashed over, the drain port 20 for closing the drain port 20 from the reservoir 36. Hence, the frangible wall 40 creates a non-functioning drain port 20 that ensures a leak tight drain port 20.

In the event that the drain port 20 must be utilized, the frangible wall 40 is fracturable to provide the fluid communication between the drain port 20 and the reservoir 36 for draining the fluid from the manifold 12 such as shown in FIGS. 4 and 5. The frangible wall 40 includes the groove 42 providing a weakened section within the manifold 12 to facilitate the fracturability of the frangible wall 40. The exterior wall 14 includes inner 46 and outer 48 surfaces and the groove 42 is formed within the outer surface 48 facing the drain port 20 to provide a smooth inner surface 46 facing the reservoir 36. Preferably, the groove 42 is a continuous annular notch which defines a perimeter of the frangible wall 40. The frangible wall 40 also includes a projection 56 extending into the drain port 20. Preferably, the projection 56 is a smooth post extending centrally from the frangible wall 40.

As with the primary embodiment, a tool is used to fracture the frangible wall 40. The tool can be of any suitable design or configuration and can be threaded into the drain port 20. Preferably, the tool is the plug 32 having an engagement portion 50 for selectively engaging the frangible wall 40 to fracture the frangible wall 40. As discussed above, the plug 32 is threadingly engaged with the drain port 20. In the embodiment of FIGS. 4 and 5, the plug 32 includes a grasping portion 58 engaging at least a portion 50 of the projection 56 to interlock the plug 32 and the frangible wall 40 when the plug 32 engages the frangible wall 40 such as shown in FIG. 4. As shown in FIG. 5, the frangible wall 40 is removed from the drain port 20 in conjunction with a removal of the plug 32.

During the fracturing of the frangible wall 40 for this alternative embodiment, the plug 32 is threaded, either manually or by use of a wrench or similar device, toward the frangible wall 40. The grasping portion 58 engages the projection 56 and the engagement portion 50 abuts the groove 42 of the frangible wall 40. Preferably, the grasping portion 58 is frictionally press-fit to the projection 56. Sufficient force is then applied to fracture the frangible wall 40 about the groove 42, see FIG. 4. As shown in FIG. 5, an aperture 54 is created within the exterior wall 14 as the plug 32 is removed from the drain port 20 with the frangible wall 40 being secured thereto. The coolant within the manifold 12 can flow out of the reservoir 36 through the aperture 54 and drain port 20. The plug 32 may subsequently be threaded back into the drain port 20, preferably without the frangible wall, to seal the aperture 54 and re-seal the drain port 20 such that the heat exchanger 10 may be refilled with coolant.

Figure 6:
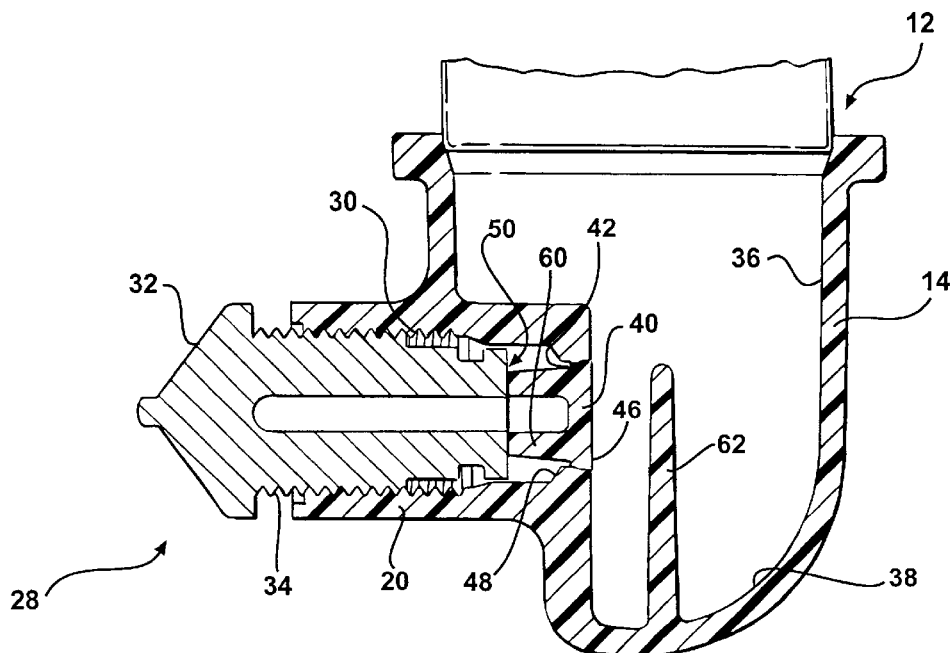
FIG. 6 is a cross-sectional view of another alternative embodiment of a heat exchanger drain assembly having a plug disposed in a drain port for fracturing a frangible wall.
Figure 7:
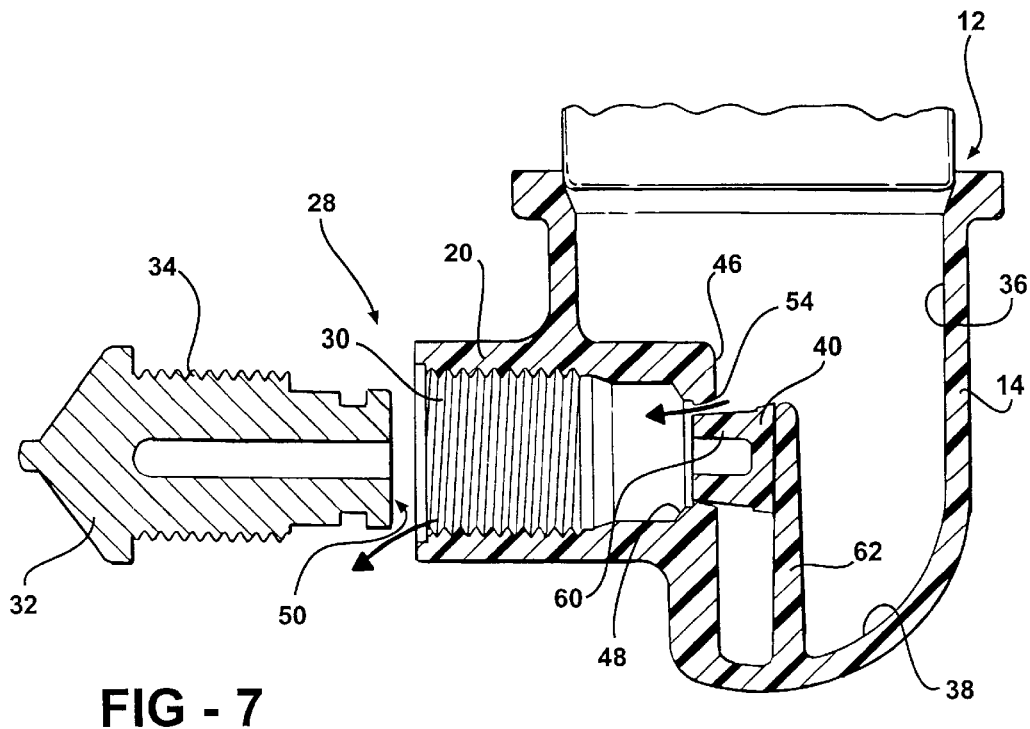
FIG. 7 is a cross-sectional view of the heat exchanger drain assembly of FIG. 6 with the plug removed from the drain port and the frangible wall abutting a partition within a reservoir.

Turning to FIGS. 6 and 7, another alternative embodiment of the heat exchanger drain assembly 28 is shown. The heat exchanger drain assembly 28 of this embodiment also includes the fluid chamber having a reservoir 36 disposed at a bottom basin 38 of the chamber. The frangible wall 40 is disposed between the drain port 20 and the reservoir 36 to close the drain port 20 and prevent fluid communication between the drain port 20 and the reservoir 36. As with the embodiments of FIGS. 2 through 5, the exterior wall 14 is continuous across, or flashed over, the drain port 20 for closing the drain port 20 from the reservoir 36. Hence, the frangible wall 40 creates a non-functioning drain port 20 that ensures a leak tight drain port 20.

In the event that the drain port 20 must be utilized, the frangible wall 40 is fracturable to provide the fluid communication between the drain port 20 and the reservoir 36 for draining the fluid from the manifold 12 such as shown in FIGS. 6 and 7. The frangible wall 40 includes the groove 42 providing a weakened section within the manifold 12 to facilitate the fracturability of the frangible wall 40. The exterior wall 14 includes inner 46 and outer 48 surfaces and the groove 42 is formed within the outer surface 48 facing the drain port 20 to provide a smooth inner surface 46 facing the reservoir 36. The frangible wall 40 of this alternative embodiment includes a projection 60 extending into the drain port 20. Preferably, the projection 60 is of a substantial width.

Another unique feature of this alternative embodiment is a partition 62 which extends from the exterior wall 14 and preferably extends upwardly from the bottom basin 38. The partition 62 therefore divides the bottom basin 38.

As with the primary embodiment, a tool is used to fracture the frangible wall 40. The tool can be of any suitable design or configuration and can be threaded into the drain port 20. Preferably, the tool is the plug 32 having an engagement portion 50 for selectively engaging the frangible wall 40 to fracture the frangible wall 40. As discussed above, the plug 32 is threadingly engaged with the drain port 20. In the embodiment of FIGS. 6 and 7, the engagement portion 50 of the plug 32 engages the projection 60 of the frangible wall 40 to fracture the frangible wall 40 such as shown in FIG. 6. As shown in FIG. 7, the frangible wall 40 is trapped between the drain port 20 and the partition 62 when the frangible wall 40 is fractured from the exterior wall 14.

During the fracturing of the frangible wall 40 for this alternative embodiment, the plug 32 is threaded, either manually or by use of a wrench or similar device, toward the frangible wall 40. The engagement portion 50 abuts the projection 60 and sufficient force is then applied to fracture the frangible wall 40 about the groove 42, see FIG. 6. As shown in FIG. 7, an aperture 54 is created within the exterior wall 14 aligned with the drain port 20. The frangible wall 40 and projection 60 become trapped between the drain port 20 and the partition 62. In particular, the projection 60 rests on one side of the aperture 54 and a back side of the frangible wall 40 abuts the partition 62. The coolant within the manifold 12 can flow out of the reservoir 36 through the aperture 54 and drain port 20. The location of the partition 62 and the configuration of the projection 60 allows coolant to flow around the projection 60 instead of pushing the projection 60 and frangible wall 40 back into the aperture 54. The plug 32 may subsequently be threaded back into the drain port 20 to seal the aperture 54 and re-seal the drain port 20 such that the heat exchanger 10 may be refilled with coolant.

Obviously, many modifications and variations of the present invention are possible in light of the above teachings and the invention may be practiced otherwise than as specifically described within the scope of the appended claims.

What is claimed is:

1. A heat exchanger (10) comprising;
   at least one manifold (12) having walls (14) defining a chamber for retaining fluid therein with a reservoir (36) disposed at a bottom of said chamber;
   a plurality of tubes (16) connected to said manifold (12) and in fluid communication with said chamber;
   a plurality of corrugated fins (18) interconnecting said tubes (16);
   a drain port (20) mounted to said manifold (12) and in selective fluid communication with said reservoir (36) for selectively draining the fluid from said manifold (12); and
   a frangible wall (40) disposed between said drain port (20) and said reservoir (36) to close said drain port (20) and prevent fluid communication between said drain port (20) and said reservoir (36), said frangible wall (40) being fracturable from the manifold to provide said fluid communication between said drain port (20) and said reservoir (36) for draining the fluid from said manifold (12).

2. A heat exchanger (10) as set forth in claim 1 wherein said manifold (12) includes at least one groove (42) defining said frangible wall (40) with said groove (42) providing a weakened section within said manifold (12) to facilitate the said fracturability of said frangible wall (40).

3. A heat exchanger (10) as set forth in claim 2 wherein said groove (42) is substantially continuous and defines a perimeter of said frangible wall (40).

4. A heat exchanger (10) as set forth in claim 1 further including a plug (32) selectively disposed within said drain port (20) for preventing fluid from draining from said manifold (12) and being removable from said drain port (20) for allowing fluid to drain from said manifold (12).

5. A heat exchanger (10) as set forth in claim 4 wherein said plug (32) includes an engagement portion (50) for selectively engaging said frangible wall (40) to fracture said frangible wall (40).

6. A heat exchanger (10) as set forth in claim 2 wherein said manifold (12) includes an exterior wall (14) defining said reservoir (36).

7. A heat exchanger (10) as set forth in claim 6 wherein said exterior wall (14) is continuous across said drain port (20) for closing said drain port (20) from said reservoir (36) to prevent fluid communication between said drain port (20) and said reservoir (36) and said groove (42) is formed within said exterior wall (14) to define said frangible wall (40) aligned with said drain port (20).

8. A heat exchanger (10) as set forth in claim 7 wherein said exterior wall (14) includes inner (46) and outer (48) surfaces and said groove (42) is formed within said outer surface (48) facing said drain port (20) to provide a smooth inner surface (46) facing said reservoir (36).

9. A heat exchanger (10) as set forth in claim 6 wherein said exterior wall (14) and said frangible wall (40) are of substantially the same thickness.

10. A heat exchanger (10) as set forth in claim 6 wherein said exterior wall (14) defines said reservoir (36) and a bottom basin (38) with said bottom basin (38) capturing said frangible all when said frangible wall (40) is fractured from said exterior wall (14).

11. A heat exchanger (10) as set forth in claim 6 wherein said frangible wall (40) includes a projection (56,60) extending into said drain port (20).

12. A heat exchanger (10) as set forth in claim 6 further including a partition (62) extending from said exterior wall (14) into said reservoir (36) to trap said frangible wall (40) between said drain port (20) and said partition (62) when said frangible wall (40) is fractured from said exterior wall (14).

13. A heat exchanger (10) as set forth in claim 6 wherein said drain port (20) is integrally formed with said exterior wall (14).

14. A heat exchanger (10) as set forth in claim 1 wherein said manifold (12) is formed of a nylon material.

15. A heat exchanger (10) as set forth in claim 14 wherein said drain port (20) is integrally formed with said manifold (12).

* * * * *